United States Patent Office 3,550,112
Patented Dec. 22, 1970

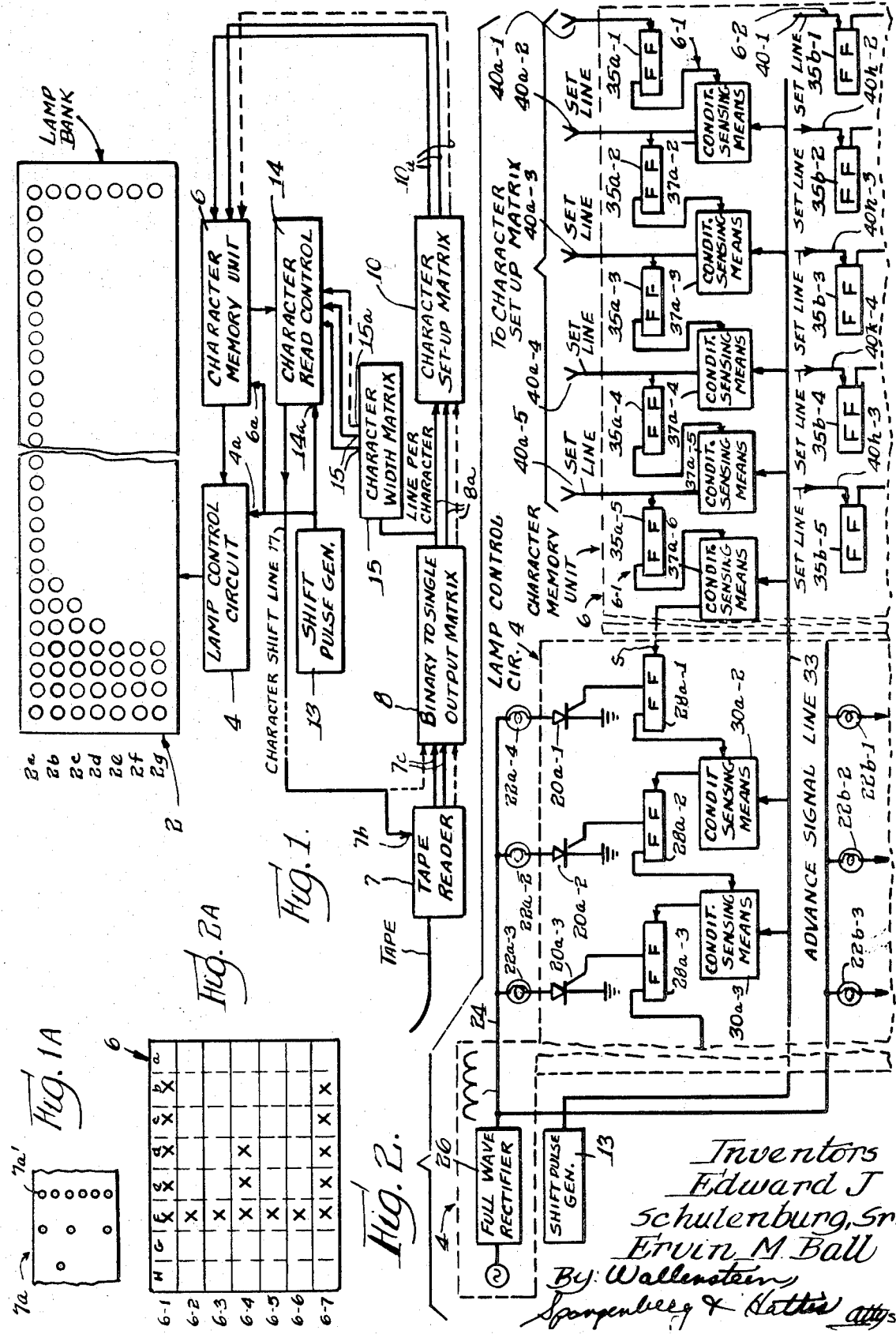

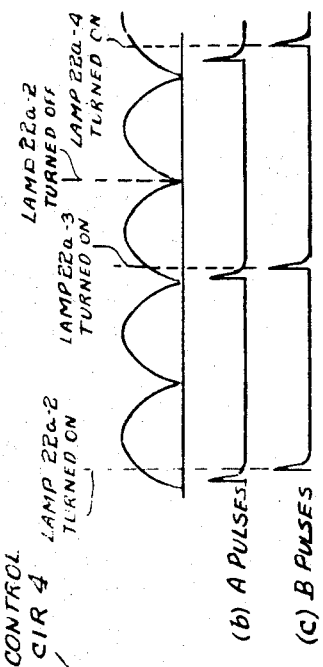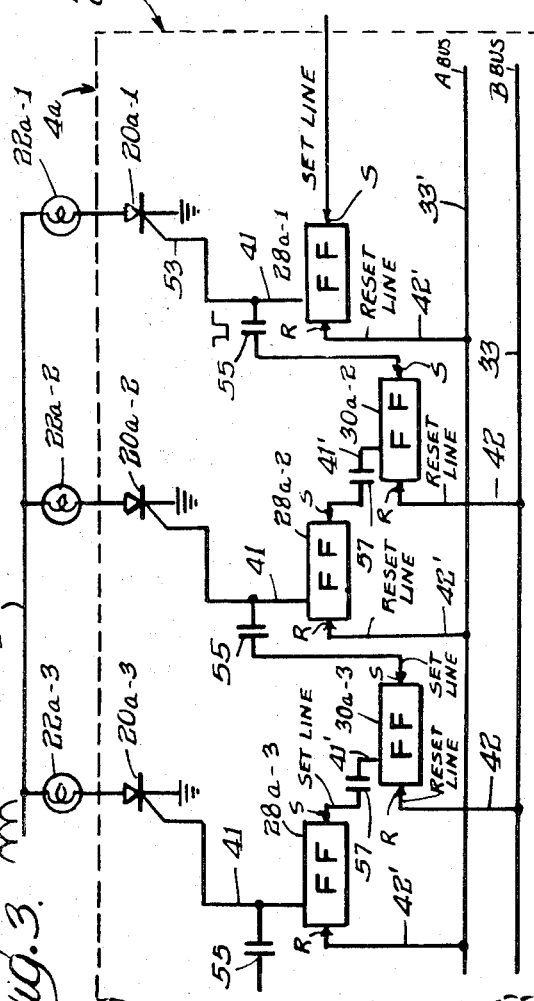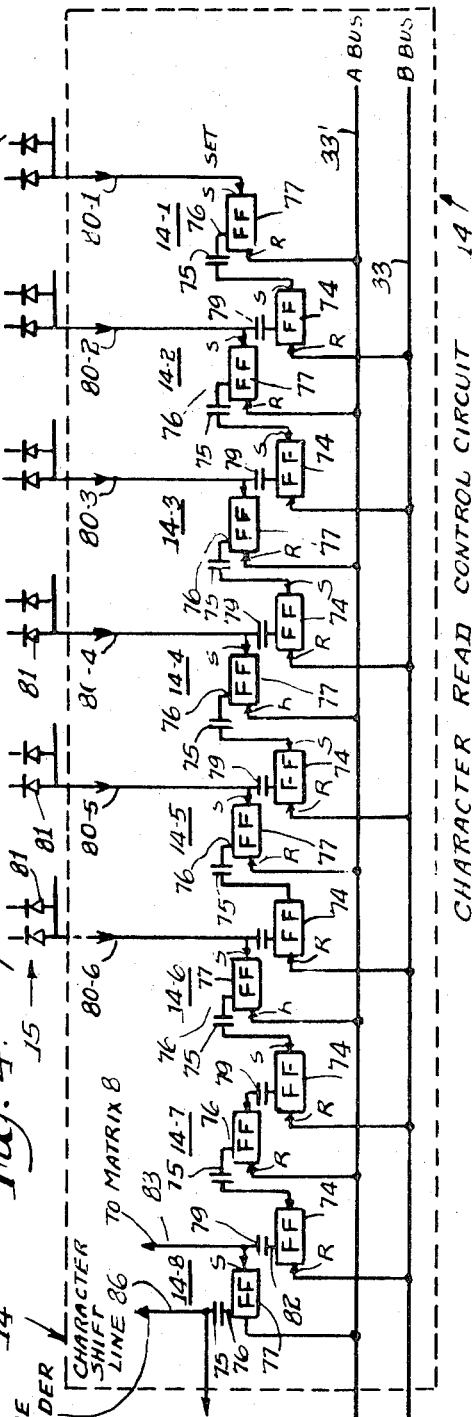

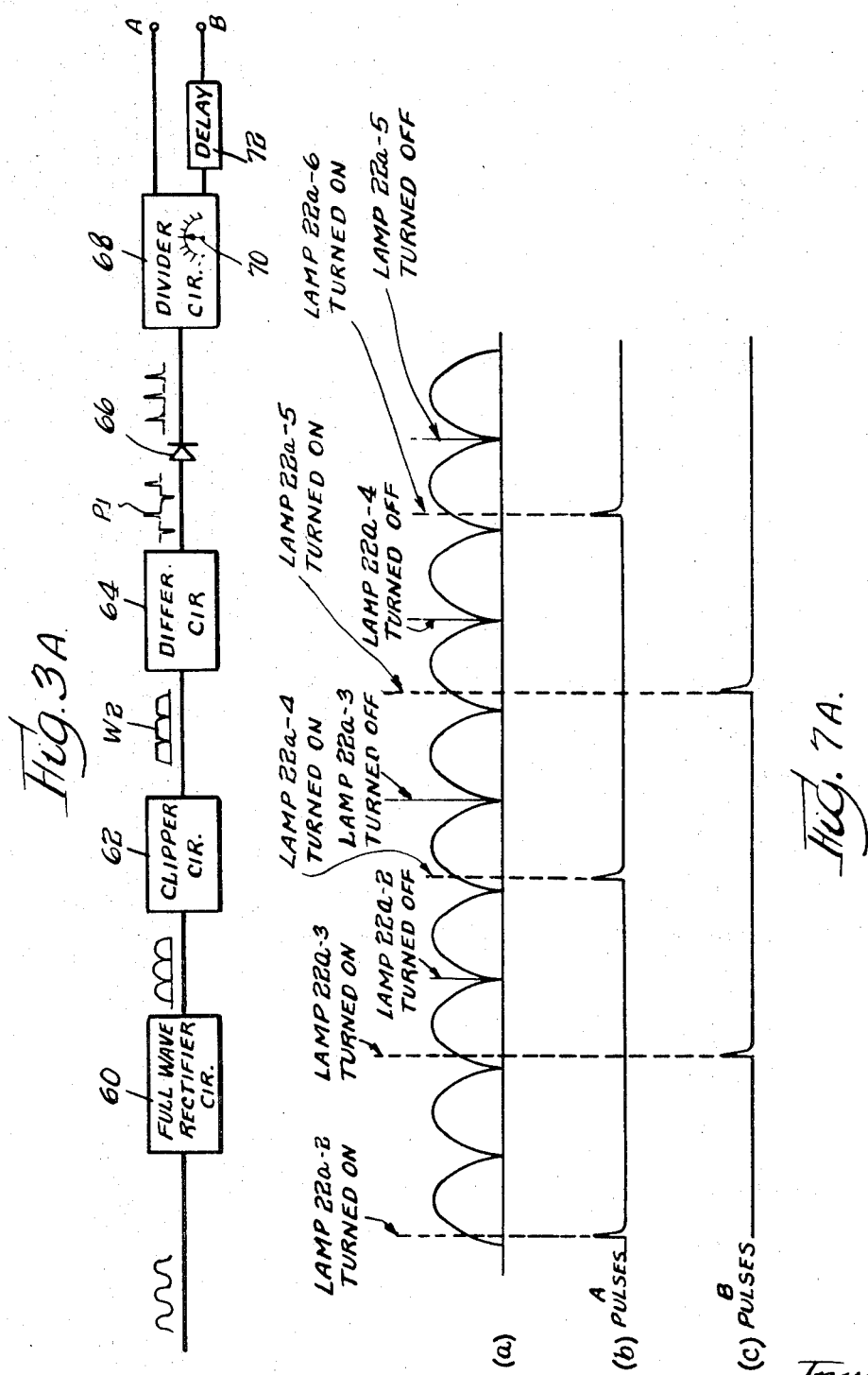

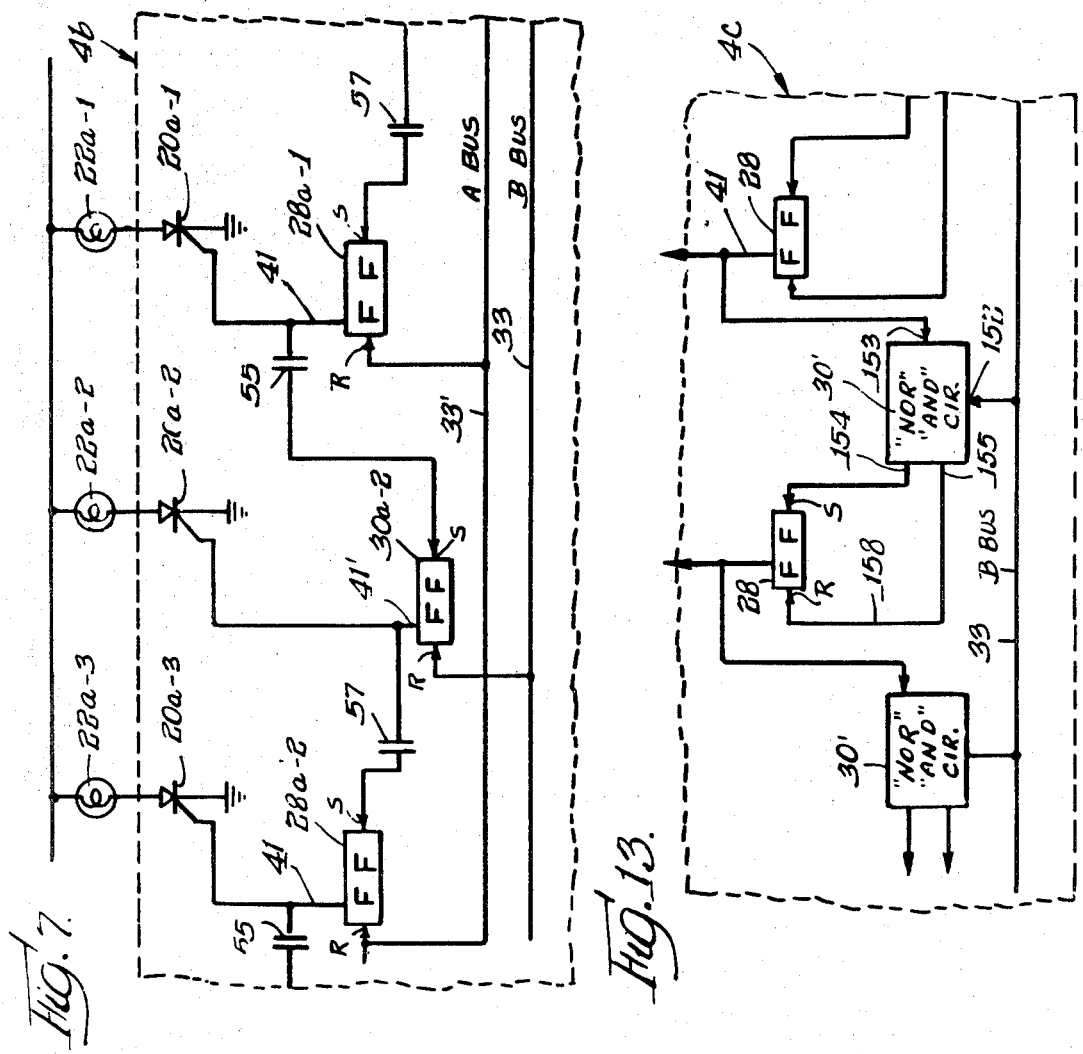
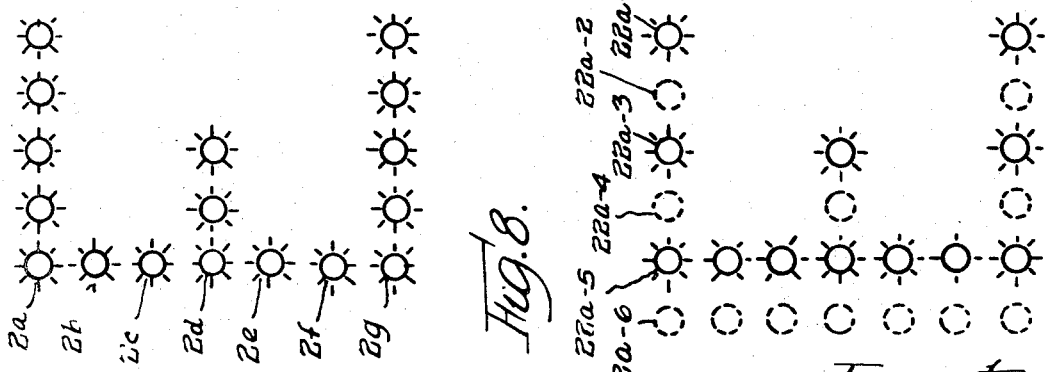

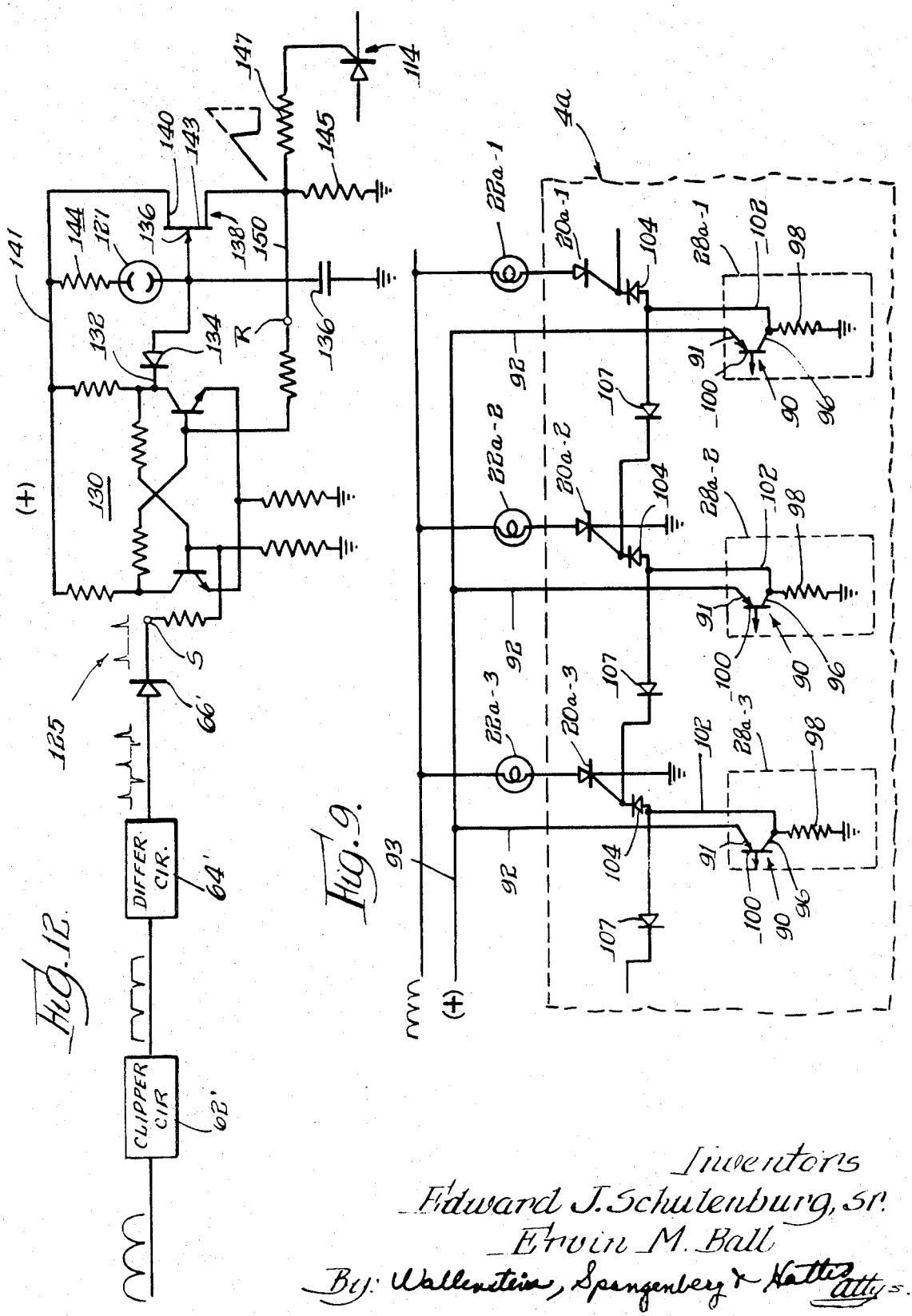

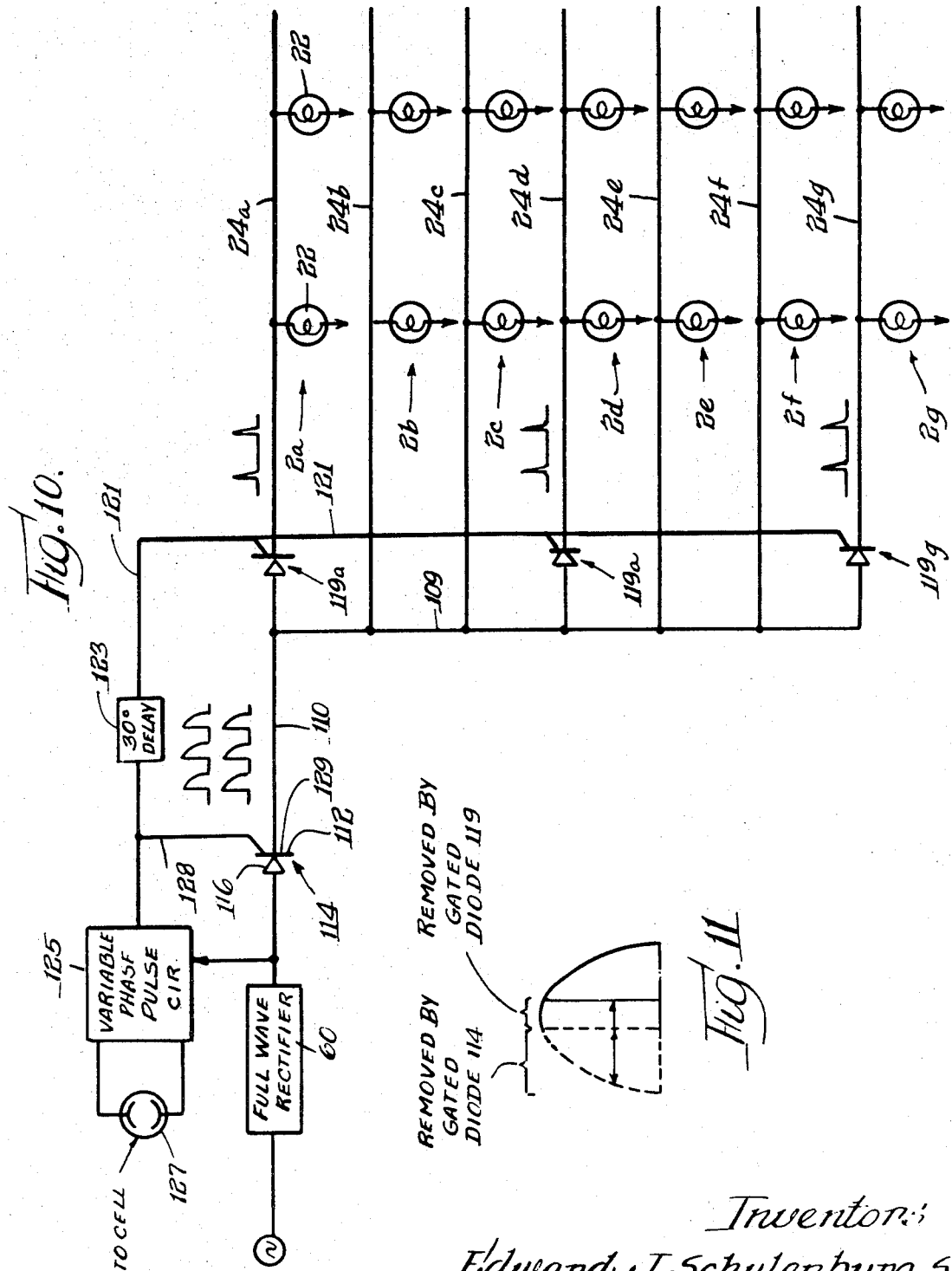

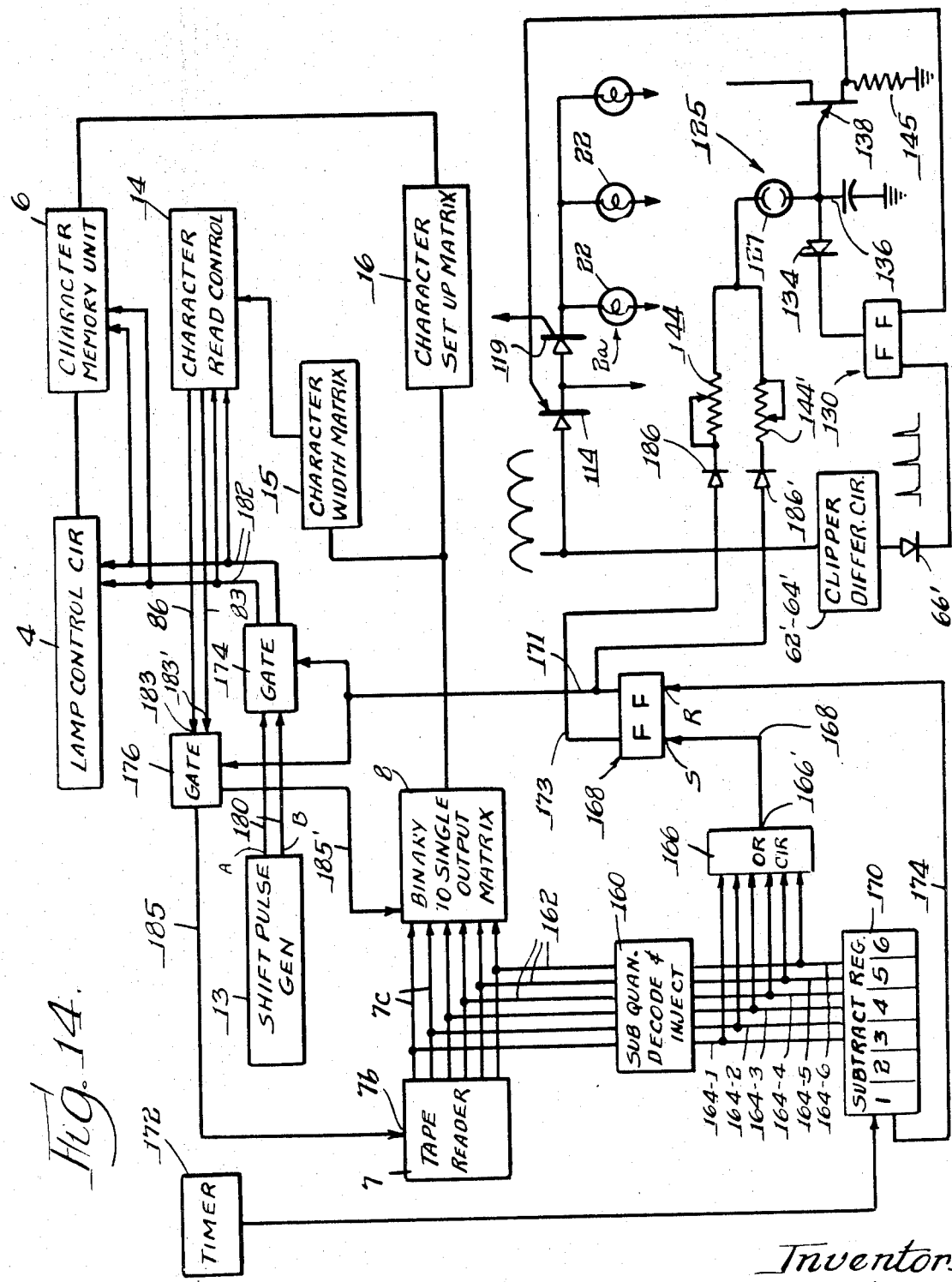

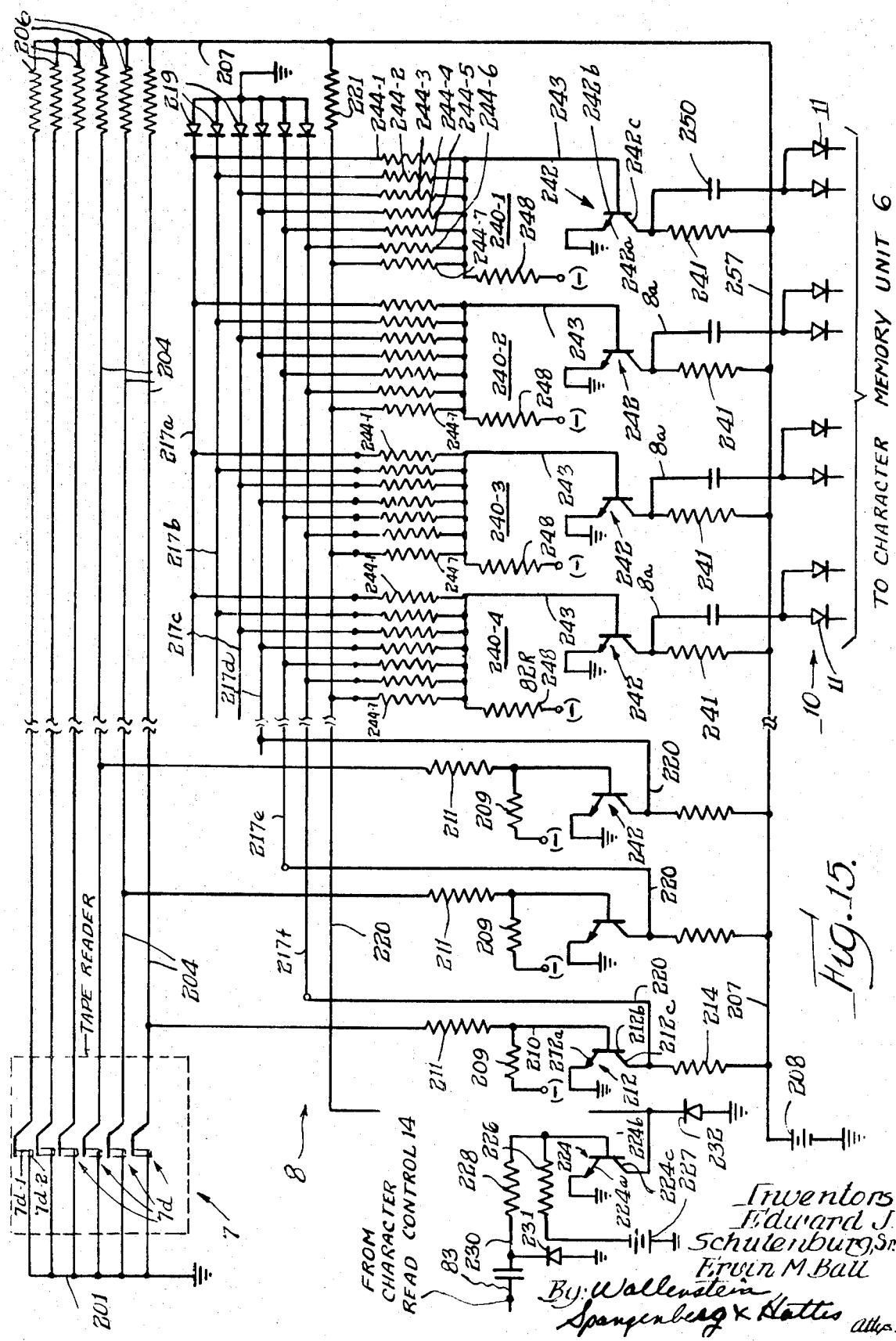

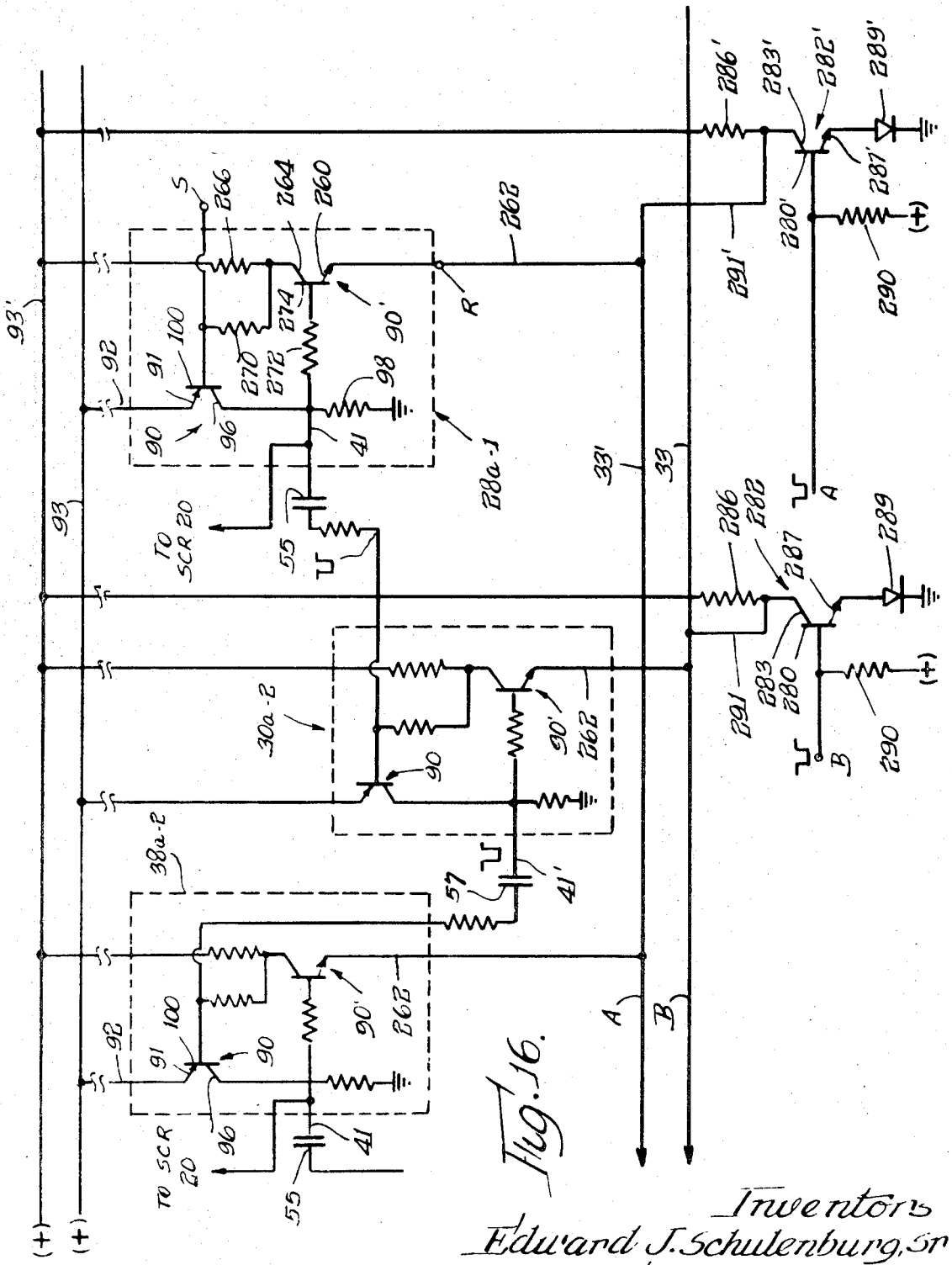

3,550,112
SOLID STATE SIGN SYSTEM
Edward J. Schulenberg, Sr., Danville, Ill., and Ervin M. Ball, Indianapolis, Ind., assignors to Time-O-Matic, Inc., Danville, Ill., a corporation of Illinois
Original application Mar. 2, 1965, Ser. No. 436,469. Divided and this application Sept. 27, 1968, Ser. No. 798,226
Int. Cl. G09f 9/36
U.S. Cl. 340—334                    3 Claims

ABSTRACT OF THE DISCLOSURE

A running sign lamp bank system wherein the lamps of the bank are energized to different degrees depending on the ambient light conditions and the frequency or rate at which a given lamp is energized to provide a relatively even constant intensity level. Thus, the rows of lamps which are located at the top, center and bottom of the bank which display the top, center or bottom legs of block letters like E, R, B, etc., are fed with lower currents than the other rows of lamps so the average energization levels of the various rows of lamps are more nearly equal.

---

This application is a division of application Ser. No. 436,469, filed Mar. 2, 1965.

The present invention relates to improvements in a running sign system, although some aspects of the invention have a broader application.

Due to the manner in which running signs were heretofore operated, it was necessary for each alphabet or numerical character and the space between characters to occupy a standard sized block. For example, a narrow letter (like I and T) and the spaces on the opposite sides thereof occupied the same sign area as a much wider letter and the associated spaces, with the result that the spacing between narrow letters was much greater than the spacing between wider letters. Because of the circuit logic and arrangement of the present invention, each letter or numeral and the spaces on the opposite sides thereof occupy a sign area proportional to the width of the letter or numeral so that the spacing between all letters of a word or number can be the same.

The lamps used in the lamp banks generally require a finite time to warm up, and the intensity of the light generated by a lamp is dependent, in part, upon the average "on" time of the lamp. Therefore, in a running sign for a letter like the letter "E" which requires simultaneous energization of a number of adjacent lamps in a row to form the upper and lower legs of the letter, the average intensity of the light generated by the lamps which reproduce the upper and lower legs of the letter will be much greater than the lamps which form the vertical leg of the letter since the latter lamps are energized for only a short period whereas each lamp forming the upper and lower legs of the letter moving down the lamp bank remains energized for a prolonged period. The resultant substantial variation in lamp intensity is undesirable both from an aesthetic and economical viewpoint. Several features of the present invention reduce this problem by providing a sign where the differences in intensity of the lamps forming different parts of any letter are reduced substantially.

The lamps which form the vertical leg of a letter are frequently on for such a short period of time that, considering the normal speed at which a running sign moves, there is barely enough time for the light to warm up to reach an acceptable intensity. Several features of the present invention provide a greater intensity for these lamps without reducing the speed of the running sign.

Another problem which is overcome by the present invention is that the overall required intensity of a lighted sign varies with the time of day. One of the features of the invention automatically varies the lamp intensity with the ambient light conditions.

Other aspects of the invention relate to various details of the circuitry which result in a minimum power drain, maximum reliability, and minimum circuit complexity.

The various features of the invention are disclosed in the specification to follow, the claims and the drawings wherein:

FIG. 1 is a basic block diagram of one form of running sign system incorporating features of the present invention;

FIG. 1A is a fragmentary view of a portion of the tape fed to the equipment shown in FIG. 1;

FIG. 2 is a detailed block diagram disclosing a basic form of lamp control circuit and character memory unit forming part of the sign system of FIG. 1;

FIG. 2A is a diagrammatic view of the various stages of the shift register circuits making up the character memory unit;

FIG. 3 is a detailed block diagram illustrating a preferred lamp control circuit;

FIG. 3A is a detailed block diagram of the A and B shift pulse generator circuit forming part of the sign system of FIG. 1;

FIG. 4 is a detailed block diagram illustrating a preferred character read control circuit forming part of the sign system of FIG. 1;

FIG. 5 is a timing diagram illustrating the relative phases of various waveforms in the circuits of FIGS. 3 and 4;

FIG. 6 shows the lamps which are energized to produce the character "E" when the lamp control circuit of FIG. 3 is utilized;

FIG. 7 shows a modified lamp control circuit where alternate lamps are energized at a given time;

FIG. 7A is a timing diagram illustrating the relative phase of various waveforms in the circuit of FIG. 7;

FIG. 8 shows the lamps which are energized to produce the character "E" for the lamp control circuit of FIG. 7;

FIG. 9 shows a modified lamp control circuit where successive lamps are energized at the same time;

FIG. 10 shows an energizing circuit for the lamps of the lamp bank which provides for selective dimming of certain rows of the lamp banks and control over the intensity of the lamps in accordance with the ambient light conditions of the lamp bank;

FIG. 11 shows the waveform of the current flow through the lamps of the lamp bank and the manner in which the average current flow there through is controlled;

FIG. 12 illustrates a variable phase pulse circuit operated from a photocell which forms part of the circuit of FIG. 10;

FIG. 13 illustrates a basic modification of the circuit logic of the various shift register circuits shown in FIGS. 3 and 4;

FIG. 14 illustrates a block diagram of a combined running and stationary sign system with provision for controlling the average light intensity of the lamp bank in accordance with the ambient light conditions;

FIG. 15 illustrates an exemplary circuit diagram of a binary to single output matrix and the character set-up matrix forming a part of the circuits illustrated in FIGS. 1 and 14; and FIG. 16 is an exemplary circuit diagram of a portion of the lamp control circuit of the embodiment of the invention shown in FIG. 3 and illustrating the circuitry of the bi-stable circuits which control the gated diodes associated with the lamps in the lamp bank.

GENERAL DESCRIPTION

Referring now to the basic block diagram of FIG. 1, all of the various forms of the invention to be described are for the purpose of controlling the energization of rows of lamps in a lamp bank 2, seven rows being illustrated by way of example, and identified by reference characters 2a, 2b, 2c, 2d, 2e, 2f, and 2g. The corresponding lamps in each of the rows are preferably aligned in columns. The lamp bank 2 is illustrated as being a horizontally elongated lamp bank capable of receiving relatively long running signs. (It should be recalled, however, that some aspects of the invention have application to stationary sign systems.)

The lamp bank 2 is controlled by a very unique static element logic control circuit including a lamp control circuit 4 which directly controls the energization of the various lamps in the bank. The lamp control circuit 4 most advantageously comprises a number of individual shift register circuits to be described, one such circuit being provided for each row of lamps. Lamp energizing markers are sequentially fed into the stages of the shift register circuits of the lamp control circuit associated with the group of lamps at the right-hand of the lamp bank 2 and in a pattern corresponding with the particular alphabet or numerical character being first displayed on the lamp bank at a given moment. The various patterns of lamp energizing markers entered into the shift register circuits are sequentially advanced through the various stages of the shift register circuits. The presence of a lamp energizing marker in a stage of a shift register circuit associated with a particular lamp will result in the energization of that lamp.

The lamp energizing markers are fed into the shift register circuits of the lamp control circuit 4 from a character memory unit 6. In the preferred form of the invention, the character memory unit 6 comprises a series of shift register circuits 6–1, 6–2, 6–3, 6–4, 6–5, 6–6, and 6–7 (FIG. 2A), one such circuit being associated with each row of lamps in the lamp bank. Each shift register circuit of the lamp control circuit has a number of stages $a, b, c, d, e, f$ ($a$ being the first stage at the right-hand end thereof) equal in number to the number of lamps which must be energized in a row of lamps for the widest alphabet or numerical character to be displayed on the lamp bank plus a number of stages $g$ and $h$ equal to the number of lamps which remain de-energized in the space between successive characters. (It is assumed, for example, that the widest character to be displayed on the lamp will require energization of six lamps in a given row of lamps and that the space between successive characters will occupy two columns of lamps of the lamp bank.) A pattern of lamp energizing markers (each identified by an $x$ in FIG. 2A) are first placed within the stages $a$ through $f$ of the various shift register circuits of the character memory unit 6 (the $f$ stage containing the marker forming the left-hand portion of the character involved) in a pattern which corresponds to the particular alphabet or numerical character read by a tape reader 7 to which punched tape 7a (FIG. 1A) is fed. The advancement of lamp energizing markers in any shift register circuit will be to the left and so as the lamp energizing markers shown in FIG. 2A are shifted in the shift register circuit 6–1 through 6–7, the outline E of markers shown moves to the left and, as will be explained in more detail, will be transferred into the right hand stages of the corresponding shift register circuits of the lamp control circuit 4. The number of shift operations required to empty the character merging unit of markers thus varies with the width of the character involved.

In the exemplary embodiment of the invention being described, it will be assumed that a 6-element binary coded group of punched holes 7a' is utilized to indicate each alphabet or numerical character, the code occupying a single column extending transversely across the tape 7a. The tape reader 7 reads one column of binary coded characters at a time. The tape 7a is automatically advanced in accordance with well established tape reader practice each time the tape reader receives an advance signal on an advance input line 7b. The tape reader 7 has a number of output lines 7c corresponding to the number of binary coded characters in each code group on the tape 7a so that the voltage or current pattern on the output lines 7c duplicates the particular code being read by the tape reader. The output lines 7c extend to a binary to single output matrix 8 which energizes one of a number of output lines collectively identified by reference 8a, the particular output line being energized corresponding to the alphabet or numerical character read by the tape reader 7a at a given instant.

The output lines 8a of the binary to single output matrix 8 are connected to a character set-up matrix 10 and a character width matrix 15. The character set-up matrix 10 includes groups of diodes 11 (FIG. 15) associated with each output line of the matrix 8 which extend to those stages of the various shift register circuits making up the character memory unit 6 which form the pattern of the character involved. Thus, depending upon the particular output line 8a which is energized, a pattern of lamp energizing markers is set up in the stages of the character memory unit 6 corresponding to the alphabet or numerical character being read by the tape reader 7.

The shift register circuits of the lamp control circuit 4 and the character memory unit 6 associated with a given row of lamps in the lamp bank are connected in tandem so that the lamp energizing markers are transferred one column of markers at a time from the left hand stages $h$ of the various shift register circuits of the character memory unit 6 to the right hand stages of the shift register circuits of the lamp control circuit 4. The advancement of the lamp energizing markers in the circuits 4 and 6 are under control of output pulses from a shift pulse generator 13 of any well-known type which feeds shift pulses to shift input terminals 4a and 6a of the lamp control and character memory unit circuits 4 and 6.

When all of the lamp energizing markers have been fed from the character memory unit 6, this condition is sensed in any one of a number of ways, as by the provision of a character read control unit 14 which effects the feeding of an advance pulse to the advance input terminal 7b of the tape reader 7 so that the next column 7a' of binary coded information on the tape 7a is fed to the tape reading position of the tape reader 7. When this occurs, a new pattern of lamp energizing markers are entered into the character memory unit 6.

The character read control unit 14 may take a variety of forms. In the preferred form of the invention, the character read control unit comprises a single shift register circuit having the same number of stages as any one of shift register circuits of the character memory unit 6. A character width matrix 15 is provided which may be a diode matrix which has a separate output 15a for each different character width. For example, if the widest character occupies six lamps on the lamp bank, the character width matrix 15 will have six output lines representing the six possible character widths. The character width matrix 15 is coupled to the output lines 8a to energize the output 15a which identifies the width of the particular character being read by the tape reader 7. A marker will be placed in the stage of the shift register circuit making up the character read control unit 14 which corresponds to the right-hand-most stage of the shift register circuits of the character memory unit 6 which contains a lamp energizing marker.

The output of the shift pulse generator 13 is fed to a shift input terminal 14a of the character read control unit 14 so that the marker in the shift register circuit making up the character read control unit 14 will advance in synchronism with the advancement of the lamp energizing markers in the character memory unit 6. As the marker leaves the left-hand-most stage of the shift register circuit of the character read control 14, a signal is fed on a character shift line 17 to the advance input terminal 7b of the tape reader 7, bringing the next binary code group into reading position as above explained.

As previously indicated the provision of the character memory unit 6 as described above will effect a fixed spacing between all characters in a word or number group independently of the width of the character. This is a substantial improvement over the appearance of the usual running sign wherein the spaces between successive characters vary with the width of the character due to the fact that a given size character block is utilized for all characters displayed on the sign.

LAMP CONTROL AND CHARACTER MEMORY CIRCUITS OF FIG. 2

FIG. 2 illustrates a generalized form for the lamp control circuit 4 when using gated diodes for controlling the energization of the various lamps, the gated diodes being identified by reference 20 followed by an alphabet character indentifying the row of lamps involved and a number identifying the column of lamps involved. In the circuit illustrated, the anode electrode of each gated diode is connected to one of the lamps of the lamp bank, the lamps being identified by reference number 22 followed by an alphabet character identifying the row of lamps and a number identifying the column of lamps involved. the lamps, in turn, are connected to a common power bus 24 leading to the output of a full-wave rectifier circuit 26 which would normally be fed from a commercial source of 60 cycle alternating current.

The cathode electrodes of the gated diodes 20 are grounded and the control electrodes thereof are connected respectively to lamp control bistable or flip-flop circuits identified by reference 28 and an alphabet character identifying the associated row of lamps and a number identifying the associated column of lamps involved. When one of the bistable circuits 28 is triggered into a set state, a direct current (DC) voltage is fed to the control terminal of the associated gated diode 20 to effect the firing thereof. The gated diode continues in a highly conductive state for the remainder of the half cycle of the rectified current pulsation which flows through the gated diode and the lamp associated therewith independently of the voltage in the control electrode thereof. The control electrode gains control over the conductive state of the gated diode when the current drops to near zero, that is below what is referred to as a holding current level. The gated diode will again fire at the beginning of the next half cycle if the associated bistable circuit remains in the set state.

Each of the bistable circuits 28 forms part of a stage of a shift register circuit with the other bistable circuits associated with the lamps of the same row of lamps of the lamp bank 2. Although any conventional shift register circuit may be utilized in the practice of the broad aspects of the present invention, certain aspects of the present invention deal with the nature of the shift register circuit which has particular advantages in a lamp control circuit of the type now being described.

The bistable circuits 28a-2, 28a-3, etc., other than the right-hand-most bistable circuit 28a-1, etc., of each shift register circuit of the lamp control circuit 4 is controlled by a condition sensing means generally indicated by reference number 30 followed by an alphabet character identifying the associated row of lamps and a number identifying the associated column of lamps. The first bistable circuit 28a-1, etc., of each shift register circuit is set by a signal fed to a set input terminal S thereof from the last stage of the corresponding shift register circuit of the character memory unit 6. (The aforementioned lamp energizing marker is represented by a set state of a bistable circuit 28.) The condition sensing means 30 associated with each bistable circuit determines whether the associated bistable circuit will be set or maintained in the reset state. A number of different circuits for the condition sensing means 30 will be described. Suffice it to say at this point in the specification, each condition sensing means 30 effects the setting of the associated bistable circuit 28 at a point in time coincident with the presence of an advance pulse on an advance signal line 33 if the bistable circuit 28 to the right of it is in a set state prior to the generation of the advance pulse. If, on the other hand, the latter bistable circuit is in a reset state, the condition sensing means 30 involved will either maintain or effect a resetting of the bistable circuit which it controls on the presence of the next advance pulse on the advance signal line 33.

The shift register circuits of the character memory unit 6 are, in most respects, similar to the shift register circuits just described in connection with the lamp control circuit 4, and, accordingly, except for the first stage of each of the shift register circuits of the character memory unit 6, includes a bistable circuit identified by reference 35 followed by an alphabet character identifying the associated row of lamps and a number identifying the associated column of lamps. Each shift register circuit stage except the first one includes a condition sensing means identified by reference number 37 followed by an alphabet character and a number respectively utilized to identify the associated row and column of lamps. The first stage of each shift register circuit 6-1, or 6-2, or 6-3, etc. of the character memory unit comprises a bistable circuit 35a-1, or 35b-1, etc. As previously indicated, each of the shift register circuits of the character memory unit 6 has eight stages in the exemplary embodiment of the invention, only five of which appear in FIG. 2. The shift register circuits associated with the character memory unit 6 are different from those of the lamp control circuit 4 in that the former are initially set in accordance with a given pattern corresponding to the associated alphabet character or number by set input lines identified by reference number 40 followed by an alphabet character and number identifying the associated row and column of lamps. The various set lines 40 are the previously mentioned output lines 10a of the character set-up matrix 10 described in connection with FIG. 1.

Once the various bistable circuits 35 are set, the subsequent presence of advance pulses on the advance signal line 33 will result in the sequential movement of the pattern of set states involved toward the left-hand end of each of the shift register circuits making up the character memory unit 6. As previously indicated, the set state of a last stage of the bistable circuits making up the character memory unit 6 will result in the setting of the first bistable circuit of the first stage of the associated shift register circuit of the lamp control circuit 4 upon the occurrence of the next advance pulse on the advance signal line 33.

SPECIFIC LAMP CONTROL CIRCUIT OF FIG. 3

Refer now to FIG. 3 which illustrates a specific lamp control circuit 4 wherein the condition sensing means 30 are bistable circuits (to be referred to as intermediate bistable control circuits) like the lamp control bistable circuits 28.

Each of the bistable circuits 28 and 30 has a set input terminal S and a reset terminal R for respectively setting and resetting the bistable circuit when signals of proper polarity (to be referred to as set and reset signals) are fed thereto. The reset terminals of the lamp control bistable circuits 28 are connected by conductors 42' to an A signal bus 33' upon which pulses appear having the phase indicated by the waveform (b) shown in FIG. 5. It should be noted that these A pulses occur during alternate half cycles and a short time after the beginning of each half cycle of the A.C. rectified current fed to the lamps 22 from the output of the rectifier circuit 26. The reset terminals of the intermediate bistable circuits 30 are connected to a B signal bus 33 on which pulses appear having the phase indicated by the waveform (c) shown in FIG. 5. The B pulses occur during the same half cycles as the A pulses and are delayed by a small angle from the A pulses.

Each of the lamp control bistable circuits 28 has an output line 41 and each of the intermediate bistable circuits has an output line 41'. It will be assumed that each of these output lines will have applied thereto a negative or ground voltage when the bistable circuit is in a reset state and a positive voltage when the bistable circuit is in a set state. The output line 41 is connected to the control electrode of the associated gated diode 20 to fire the same when the bistable circuit is in a set state. The gated diode will continue in a conductive state independently of the voltage thereafter fed to the control electrode thereof for the remainder of the half cycle of current flow involved. Near the end of the half cycle, the current flowing through the gated diode will drop below what is referred to as a holding current level, wherein the control electrode thereof regains control. The gate diode will continue to conduct in subsequent half cycles until the associated bistable circuit 28 is reset.

As is apparent from waveform (b) in FIG. 5, each lamp control bistable circuit 28 which is in a set state will be reset every other half cycle on the occurrence of an A pulse. (As previously indicated, the setting of a bistable circuit 28 will have no effect on the control of the associated gated diode until the end of the half cycle of current flows through the gated diode involved.) Since the A pulses occur during alternate half cycles, once a gated diode has become conductive it will remain conductive to energize the associated lamp for the remainder of the half cycle involved and for an added two full half cycles, which, when the source of energizing voltage for the lamps in a full wave rectified 60 cycle voltage source, provides an adequate warm-up time for a bright running sign display.

As previously indicated, the interconnections between the various bistable circuits 28 and 30 form a shift register circuit. To this end, a capacitor 55 is connected between the output line 41 of each of the lamp control bistable circuits 28 and the set terminals of the intermediate bistable circuit 30 of the next stage of the shift register circuit. The intermediate bistable circuits 30 are designed so that only a negative going pulse fed to the set terminals S thereof will effect the setting thereof. Such a negative going voltage occurs when a given lamp control bistable circuit 28 is switched from a set to a reset state by the feeding of an A pulse to the reset input R thereof.

The shift register circuit operates in such a manner that when a given lamp control bistable circuit 28 is in a set state, this set state will be transferred to the next stage of the bistable circuit when advance pulses are fed to the shift register circuit. The A and B pulses, in the manner now to be explained, act as shift or advance pulses for the shift register circuit. Assuming that the first lamp control bistable circuit 28a–1 is in a set state, upon the occurrence of the next A pulse on the line 33', the bistable circuit is reset which generates a negative going voltage on the output line 41 which is coupled through the capacitor 55 to the next intermediate bistable circuit 30a–2 to set the same. If the bistable circuit 28a–1 was in a reset state during the occurrence of the A pulse, the state of the bistable circuit will not change and no signal voltage will be coupled through the capacitor 55, and the intermediate bistable circuit 30a–2 will remain in its reset state. In effect, the intermediate bistable circuits act as memory units which memorize the last state of the preceding lamp control bistable circuit following the generation of each A pulse.

In the case where the intermediate bistable circuit 30a–2 is triggered to a set state, the bistable circuit will immediately thereafter be reset upon the generation of the next B pulse coupled to the reset terminal R thereof. When the intermediate bistable circuit like 30a–2 is reset, a negative going voltage will appear on the output line 41' thereof which is coupled by a capacitor 57 to the set input terminal of the lamp control bistable circuit 28a–2. If the intermediate bistable circuit 30a–2 had not been previously set, no signal will appear at the output line 41' or at the set input terminal S of the lamp control bistable circuit 28a–2 upon the occurrence of the B pulse. It is thus apparent that the arrangement of bistable circuits shown in FIG. 3 constitute a shift register circuit wherein a given pattern of set and reset states proceeds down the various stages of the shift register circuit at a rate depending upon the rate of the A and B pulses.

Each gated diode 20 has a control terminal connected to an output line 41 of a lamp control bistable circuit 28 and as a lamp control bistable circuit is triggered to a set state the associated gated diode will be fired into a conductive state. As previously indicated each such gated diode will continue to conduct for a full half cycle once it has been fired independently of the voltage on the control terminal thereof during which interval the associated lamp 22 will be energized. The gated diode will be re-fired at the beginning of the next two half cycles because the next A and B pulses will not recur until after the beginning of the last of the latter half cycles. Each lamp will thus be energized for about three half cycles, giving adequate warm-up time despite the fact that the A and B pulses are spaced only two half cycles (in a 60 cycle per second timing source). As one lamp becomes energized, the previous energized lamp remains energized until the end of the half cycle involved. This overlapping of the energization of successive lamps of the lamp bank allows the lamps to reach and remain at high intensity for a sufficient period to provide a proper average intensity of the sign despite the high pulse rate.

A AND B SHIFT PULSE GENERATOR 13 OF FIG. 3A

In the preferred form of the invention, the A and B pulses are generated in a manner like that shown in FIG. 3A. To this end, a source of commercial 60 cycle voltage is fed to a full wave rectifier circuit 60 which provides at the output thereof a full wave rectified waveform (a) such as shown in FIG. 5. (The rectifier circuit 60 may be the same rectifier used to produce the energizing voltage waveform applied to the bus 24 extending to the lamps 22 of the lamp bank.) The full wave rectified voltage is fed to the input of a suitable clipper circuit 62 which produces a waveform W2 like that shown at the output of the clipper circuit 62 in FIG. 3A. This waveform is fed to a conventional differentiating circuit 64 which produces positive and negative going pulses P1 centered about the sloping sides of the waveform W2. These pulses are fed through a rectifier 66 which removes pulses of one polarity to leave pulses of opposite polarity having a rate of 120 pulses per second. These pulses are fed directly to (or indirectly through an amplifier) to a divider circuit 68 which may have a manual control knob 70 providing for a selection of different division factors to produce a selection of pulse rates for the A and B pulses which varies the speed of the running sign. The pulse rate illustrated in FIG. 5 is a 60 cycles per second rate which represents a divide by 2 operation of the divider circuit. By adjusting the manual control 70 to produce a division by 4 a pulse rate of 30 cycles per second is produced which produces a rate of advance of the running sign which is one-half that produced by a 60 cycle A and B pulse rate.

The output of the divider circuit 68 is split into two branches, one of which extends to an A terminal, representing the source of A pulses and the other of which extends through a suitable delay means 72 which produces a slight delay in the pulses, fed to a B terminal representing the source of B pulses.

CHARACTER READ CONTROL CIRCUIT 14 OF FIG. 4

As previously indicated, the character memory unit 6 and the character read control circuit 14 comprises one or more shift register circuits. These shift register circuits are preferably similar to the shift register circuit just described in connection with FIG. 3 which controls one of the rows of lamps of the lamp bank. The character read control circuit 14 comprises a series of bistable circuits forming the various stages of a shift register circuit as illustrated in FIG. 4, the stages being respectfully identified by reference numerals 14–1, 14–2, 14–3, through 14–8. Except for the first stage of the shift register circuit illustrated, which comprises only a single bistable circuit 77, each stage of the shift register circuit includes an intermediate or memory bistable circuit 74 having a set input terminal S coupled through a capacitor 75 to the output 76 of the bistable circuit 77 of the preceding stage. Each bistable circuit 77 of the second and subsequent stages of the shift register circuit has a set terminal S coupled through a capacitor 79 to the output of the associated intermediate or memory bistable circuit 74. Each of the memory bistable circuits 74 has a reset terminal R connected to the B signal bus 33 and each of the bistable circuits 77 has a reset terminal R connected to the A Signal Bus 33'.

Unlike the shift register circuits forming part of the lamp control circuit 4, the shift register circuit making up the character read control circuit 14 has individual set lines 80–1, 80–2, 80–3, 80–4, 80–5, and 80–6, extending directly to the set terminals S of the bistable circuits 77 so as to preset simultaneously all of the stages to a given state of operation. The set lines 80–1, 80–2, etc. represent the output lines of the character width matrix 15 which, as previously indicated, is a diode matrix including diodes 81 connected to the output lines 8a of the binary to single output matrix 8. The latter matrix has a separate output line for each character which can be displayed on the lamp bank and energization of one of these output lines 8a indicates the character next to be fed to the right hand end of the lamp bank. The set lines 80–6, 80–5, 80–4, 80–3, 80–2, and 80–1 of the character read control circuit 14 are respectively momentarily energized by a negative going voltage when the character read by the tape reader 7 is respectively 1, 2, 3, 4, 5, and 6 lamps wide when displayed on the lamp bank 2. It is thus apparent that the various diodes 81 making up the character with matrix 15 associated with a given set input line 80 for the character read control unit 14 are connected to all of the output lines 8a of the binary to single output matrix 8 representing characters having the same width on the lamp bank.

Assuming, for example, that the character read by the tape reader 7 at a given instant is to be 5 lamps wide, the set line 80–2 will be energized at the instant tape reader 7 effects a read-out operation so as to set the bistable circuit 77 associated with the second stage 14–2 of the shift register circuit 14. On the occurrence of the various A and B pulses on the buses 33 and 33', the set state (constituting a shift register circuit marker) in the stage 14–2 will progress to the left, as viewed in FIG. 4.

As the memory bistable circuit 74 of shift register stage 14–8 is triggered into a set state, the positive going voltage appearing at the output 82 thereof is coupled through the capacitor 79 to a line 83 which energizes the binary to single output matrix 8 which, in turn, energizes the character width matrix 15 and the character set-up matrix 10 to produce a set of new markers in the character memory unit 6 and the character read control circuit 14 in accordance with the character then being read by the tape reader 7.

As the bistable circuit 77 of the last stage 14–8 of the shift register circuit becomes set momentarily, the positive going voltage occurring at the output 76 of the bistable circuit 77 is coupled by an output line 86 to the shift input terminal 7b of the tape reader 7 to move the next column 7a' of coded information on the tape 7a into reading position in the tape reader. The output line 86 is the character shift line 17 described in connection with FIG. 1. The movement of a set marker completely through the various stages of the shift register circuit making up the character read control circuit 14 indicates that all of the set markers stored in the character memory unit 6 have been transferred to the shift register circuits of the lamp control circuit 4.

LAMP CONTROL CIRCUIT 4b of FIG. 7

The lamp control circuit 4a of FIG. 3 will produce a complete lamp energizing pattern as, for example, illustrated for the letter E in FIG. 6. As indicated in the introductory part of the specification, letters like the letter E have relatively long horizontal upper, lower and intermediate horizontal legs. The lamp rows 2a, 2d and 2g of the lamp bank which reproduce these legs of the letter E produce a much higher average intensity of illumination because of the successive energization of these lamps as the letter E advances down the lamp bank than the lamp rows 2b, 2c, 2e, and 2g thereof. To minimize the difference in the average intensity of the lamps in the various lamp rows and to reduce the number of stages required in the shift register circuit forming part of the lamp control circuit 4, the lamp control circuit 4b of FIG. 7 was developed. This circuit is similar in many respects to the circuit of FIG. 3 and similar portions thereof have been given similar reference numerals. The shift register circuit portion of the lamp control circuit 4b is identical to that shown in FIG. 3 except that it requires only half the number of stages. This is brought about by the fact that the lamp control bistable circuits 28a–1, 28a–2, etc. are associated with alternate lamps 22a–1, 22a–3, etc. of the lamp bank and the lamps 22a–2, 22a–4, etc. are controlled by the memory bistable units 30a–2, 30a–3, etc. The gated diodes 20–2, 20–4, etc. associated with the lamps 22a–2, 22a–4, have control terminals respectively connected to the output lines 41' of the memory bistable circuits 30a–2, 30a–3, etc. It is thus apparent that when the memory bistable circuits 30a–2, 30a–3, etc. are in a set state, the resulting positive voltage occurring on the output lines 41' thereof will fire the associated gated diodes 20–2, 20–4, etc., which result in the energization of the associated lamps for the remainder of the half cycle involved. If the associated memory bistable circuits are immediately reset by the B pulses as in the case of the lamp control circuit 4a of FIG. 3, the gated diodes will not be fired again until the associated memory bistable circuits are again set, and so the lamps controlled by the memory bistable circuits will not have sufficient time to warm-up and remain lighted for a while at a readily visible intensity. In other words, the length of time each of the memory bistable circuits 30a–2, 30a–3, etc. will be in the reset state depends upon the time delay between each A pulse and the next B pulse. If the A and B pulses occur during the same half cycle, the associated lamp will be energized for only one-half cycle. Thus, when the lamp control circuit of FIG. 7 is used, the A and B pulses are preferably separated by several half-cycles as illustrated by waveforms b and c in FIG.7A so the lamps will be energized for a number of half-cycles. As there shown, the A pulses are separated four half-cycles, the B pulses are separated four half-cycles, and the A and B pulses are spaced two half-cycles. This will result in the energization of the even numbered lamps 22a–2, 22a–4, etc. for about three half-cycles since the memory bistable circuit 30 are set for the interval between each A pulse and the next B pulse. The odd numbered lamps 22a–1, 22a–3 will also be energized for about three half-cycles due to the fact that the spacing between each B pulse and the next A pulse determines the length of time the lamp control bistable circuits 28 remain set. The speed of the sign progression is actually the same for the A and B pulse timing shown in FIG. 7A used in the lamp control circuit of FIG. 7 and the A and B pulses timing shown in FIG. 5, used in the lamp control circuit of FIG. 5.

FIG. 8 illustrates those lamps which are energized at the instant of the setting of the lamp control bistable circuits 28a–1, 28a–2, and 28a–3. When these lamp control bistable circuits become reset two half-cycles later, the other lamps 28a–2, 22a–4 and 22a–6 to the left of the lamps which were just energized become energized for three half-cycles. Thus for a letter like the letter E, only half of the lamps in the row 2a, 2d and 2g forming the horizontal legs of the letter in lamp control circuit of FIG. 3 will be energized with the circuit of FIG. 7, thereby making the average intensity of the lamps in all the lamp rows of more equal intensity. Also, the circuit of FIG. 7 requires only one-half the shift register stages used in the circuit of FIG. 3.

MODIFIED LAMP CONTROL CIRCUIT FOR 4a' OF FIG. 9

Refer now to the lamp control circuit of FIG. 9 which is a modification of the lamp control circuit shown in FIG. 3. As previously indicated, one of the problems in running signs is the problem of warm-up time for the lamps. When a running sign is advanced along a lamp bank at a fairly high running rate, it is frequently difficult to provide enough warm-up time for the lamps. This problem is solved, in part, by the one cycle overlapping energization of the lamps previously described in connection with the circuit of FIG. 3. FIG. 9 is an improvement over FIG. 3 by providing a longer energizing period and greater degree of overlap of the energization fo the lamps without varying the phrasing or rate of the A and B pulses. In the preferred form of the invention, each of the lamp energizing bistable circuits 28a–1, 28a–2, etc. are bistable circuits of special design including two current control devices (only one of which is shown in FIG. 9 and identified by reference number 90), wherein both devices are either in a non-conductive or a conductive state, so that low drain operation can be effected when the lamp bank is not energized. The current control device 90 illustrated is a PNP transistor having an emitter electrode 91 connected by a conductor 92 to a positive direct current voltage bus 93, a collector electrode 96 connected through a resistor 98 to ground and a base electrode 100, which is connected to a part of the bistable circuit to be described later on in connection with the circuit of FIG. 16. When a lamp control bistable circuit 28 is in a set state, the current control device 90 will be in a conductive state, resulting in a positive voltage at the ungrounded end of the resistor 98. A conductor 102, couples the ungrounded end of the resistor 98 to the anode side of an isolating rectifier 104 whose anode is connected to the control terminal of the associated gated diode 20. It is thus apparent that when any of the bistable circuits 28 are energized, a positive voltage is coupled through the rectifier 104 to effect firing of the associated gated diode 20.

The improvement in the circuit of FIG. 9 over that of FIG. 3 is that each bistable output conductor 102 is coupled to the anode side of another rectifier 107 whose cathode is connected directly to the control electrode of the gated diode 20 associated with the lamp which, in the normal course of events, would be energized following the next shift operation of the shift register circuit controlling the row of lamps involved. The rectifiers 104 serve the purpose of isolating or blocking the voltage fed to the control terminals of the gated diodes 20 through the rectifiers 107 from affecting the gated diodes associated with the next stage of the shift register circuit. Thus, whenever a lamp control bistable circuit 28 is in a set state, both the associated lamp and the lamp controlled by the next stage of the shift register circuit will also be energized. Assuming that the set bistable circuit referred to is bistable circuit 28a–1, when it is reset during the next shift operation, the associated lamp 22a–1 will become de-energized at the end of the half-cycle involved, and the simultaneously lit lamp 22a–2 associated with the next stage of the shift register circuit will continue to be energized due to the transfer of the set state of the latter bistable circuit to the bistable circuit 28a–2 of the next stage of the shift register circuit. With this arrangement, each of the lamps to be energized is energized for a much greater period than the lamps in the circuit of FIGS. 3 or 7, thereby giving a greater time for the lamps to warm-up.

It should be noted that the transistors 90 forming part of each of the bistable circuits 28 act as drivers for the gated diodes 20. The gated diodes 20 and the bistable circuits 28 are most advantageously mounted upon or next to the lamp bank 2. In such case, the positive voltage bus 93 would be connected to a long conductor connecting these circuit components to a remotely located source of positive direct current voltage. Spurious voltage can be picked up in this line which could falsely trigger the bistable circuits. The use of PNP transistors 90 where the emitter electrodes 91 are connected by conductors 92 to the bus 93 extending to the source of direct current voltage feeding this bus is an importnat feature of the circuit since the spurious voltage signals coupled by the conductors 92 to the emitter electrodes 91 of the bistable circuit transistors 90 are isolated to a great extent from the other electrodes of the transistors associated with sensitive portions of the bitable circuits relative to the case where NPN transistors are utilized for the transistors 90 requiring connections of their collector electrodes to the bus 93 which would then be connected to a grounded source of negative voltage.

THE LAMP DIMMING CIRCUIT OF FIG. 10

FIG. 10 illustrates a circuit which has for its purpose the selective dimming of the upper, immediate and lower rows of lamps 2a, 2d and 2g in the lamp bank more nearly to equalize the average intensity of all the lamps energized to display a letter like the letter "E" having extensive upper, lower and intermediate horizontal legs. This circuit thus represents an improvement to the circuit of FIG. 7. The circuit of FIG. 10 also adjusts the average intensity of the lamps in the lamp bank in accordance with the ambient light conditions about the lamp bank. In other words, as the ambient lamp conditions about the lamp bank vary during weather conditions and the time of day, the average intensity of the light generated by the lights of the lamp bank will vary accordingly so that the sign will appear with the same apparent sign brightness at all times and with use of minimum power.

The various rows of lamps 2a, 2b, 2c, 2d, 2e, 2f and 2g are respectively connected to associated buses 24a, 24b, 24c, 24d, 24e, 24f and 24g. The buses 24b, 24c, 24e and 24f are connected directly to a branch line 109 leading to a common conductor 110 connected to the cathode terminal 112 of a main gated diode 114. The anode terminal 116 of the gated diode 114 is connected to the output of the aforementioned full wave rectifier circuit 60 (see FIG. 3A) fed from a commercial 60 cycle per second power system. The upper, intermediate and lower buses 24a, 24d, and 24g are connected to the common conductor 110 through individual gated diodes 119a, 119d, and 119g. The control terminals of the gated diodes 119a, 119d and 119g are connected to a common conductor 121 leading to the output of a suitable delay circuit 123. The input to the delay circuit 123 is connected to the output of a variable phase pulse circuit 125 which produces at its output pulses which vary in phase with the degree of light striking a photocell 127, which is positioned to respond to the ambient light conditions of the lamp bank. The input to the variable phase pulse generator circuit 125 is connected to the output of the aforementioned full wave rectifier circuit 60 so that the output thereof contains pulses at a rate of 120 pulses per second. The output of the variable phase pulse circuit 125 is connected by a conductor 128 to the control electrode 129 of the gated diode 114. The gated diode 114 will thus fire each half-cycle at a phase angle which is a function of the ambient light condition striking photocell 127 and will remain in the conductive state for the remainder of the half-cycle involved. Accordingly, the pulse width of the current flowing through the gated diode 114 is inversely proportional to the intensity of the light striking the photocell 127.

The phase angle of the pulses fed to the control electrodes of the gated diodes 119a, 119d and 119g, associated with the upper, intermediate and lower rows of lamps 2a, 2d and 2g in the lamp bank is delayed somewhat (such as 30 degrees) from the phase angle of the pulses which trigger the main gated diode 114, so that the width of the current pulses flowing through the gated diodes 119a, 119d and 119g will be less than the current pulsations received by the lamps in the lamp rows 2b, 2c, 2e and 2f. Thus the apparent intensity of the light generated by the lamps of all the rows of the lamp bank in the circuit arrangement of FIG. 10 will be fairly constant despite variations in ambient light conditions and despite the fact that the lamps in the uppermost intermediate and lower rows of the lamps in the lamp bank will be energized in time succession more frequently than the lamps of the other rows of lamps.

THE VARIABLE PHASE PULSE CIRCUIT 125 OF FIG. 12

FIG. 12 illustrates an exemplary variable phase pulse circuit which is most advantageously used for the circuit 125 shown in box form in FIG. 10. This circuit may include a clipper circuit 62' for clipping the full wave rectified waveform fed thereto from the full wave rectifier 60, a differentiating network 64' for differentiating the waveform at the output of the clipper circuit, and a rectifier 66' for passing pulses of only one polarity, such as positive pulses occurring at a rate of 120 pulses per second. It is apparent that the circuits 62' and 64' and the rectifier 66' may be the same corresponding by numbered elements as shown in FIG. 3A which form part of the shift pulse generator circuit 13.

The 120 pulse per second output of the rectifier 66' is fed to the set input S of a conventional bistable circuit 130. The bistable circuit 130 illustrated has an output line 132 connected to a rectifier 134 arranged to pass a negative or ground voltage and to block a positive voltage. When the bistable circuit 130 is set, the upper line 132 has a positive voltage and when it is reset in a manner to be explained the voltage at the output line 132 is at ground potential.

The anode side of the rectifier 134 is connected to the ungrounded end of a grounded capacitor 136. The unground end of the capacitor 136 is connected to the emitter electrode 136 of a double base diode 138 having one of its bases 140 connected to a positive bus 141 extending to the positive terminal of a source of positive direct current voltage and another base 143 connected through a resistor 145 to the ground. The aforementioned photocell 127 is connected between the emitter electrode 136 and a resistor 144 connected to the positive bus 141. It should be thus apparent that when the bistable circuit 130 is in a set state wherein the rectifier 134 blocks the resulting positive voltage on the output line 132, the double base diode 138 and the associated elements including the capacitor 136, photocell 127 and resistor 144 form a relaxation oscillator circuit of well-known design (except for the photocell) where the voltage across the capacitor 136 rises at a rate depending upon the intensity of the light striking the photocell 127. As a greater amount of light strikes the photocell 127, the impedance thereof decreases to increase the charging rate of the capacitor 135. The voltage across the capacitor 136 will, therefore, reach the voltage which causes firing of the double base diode much sooner when the light striking the photocell 127 is at a high intensity than when it is at a lower intensity. When the double base diode 138 fires, a voltage pulse will appear across resistor 145 as the capacitor 136 discharges. This pulse is fed through a resistor 147 to the control terminal of the main gated diode 114 controlling the flow of current to the buses of the lamps in the lamp bank.

The pulse appearing across the resistor 145 is also coupled by a conductor 150 to the reset input R of the bistable circuit 130 to reset the same. When the bistable circuit 130 is reset, as previously indicated, the voltage on the output line 132 thereof becomes grounded. This ground potential is passed by the rectifier 134 to the ungrounded end of the capacitor 136, which is thereby maintained in a discharged state until the next pulse from the rectifier 66 is fed to the set input S of the bistable circuit 130. It is thus apparent that the ungrounded end of the resistor 145 has produced thereat pulses at a repetition rate of 120 cycles per second and at a phase angle depending upon the intensity of the light striking the photocell 127.

SHIFT REGISTER CIRCUIT OF FIG. 13

In the exemplary forms of the invention described above, the shift register circuits included intermediate or memory bistable circuits 30 which carry out the function of the condition sensing means shown in box form in the generalized disclosure of the invention of FIG. 1. Although less preferred, each memory bistable circuit 30 can be replaced by a "NOR"-"AND" gate circuit generally indicated by reference numeral 30' in FIG. 13. Each of the circuits 30' has input terminals 152 and 153 and output terminals 154 and 155. Input terminal 153 extends directly to the output line 41 of a bistable circuit 28 which may control the energization of one of the lamps of the lamp bank. The other input terminal 152 extends to the B pulse bus 33.

Assuming that the B bus pulses are positive pulses, each circuit 30' would feed a setting signal to the set terminal S of the bistable circuit 28 of the associated stage of the shift register circuit if the voltages on the input treminals 153 and 152 are both positive. (It will be recalled that, in the shaft register circuits used particularly for the lamp control circuit, the voltage on the output lines 41 are positive during the set state of the associated bistable circuits.) This result can be accomplished by a well known simple "AND" logic circuit. If, on the other hand, the voltage on input terminal 153 is ground or negative while the voltage on the other input terminal 152 is positive (or vice versa), a reset signal will be generated at the output terminal 155 which is coupled by a conductor 158 to the reset terminal R of the bistable circuit 28. A "NOR" logic circuit will accomplish this function.

It can be seen that with the circuit arrangement just described, the arrangement of bistable circuits and the "NOR"-"AND" circuits just described that a shift register circuit is provided which carries out the same functions as the shift register circuit shown in FIGS. 3, 4 and 9 (although it could not perform the function of the circuit of FIG. 7).

COMBINED RUNNING AND STATIONARY SIGN SYSTEM OF FIG. 14

The circuit of FIG. 14 has many of the components present in the simplified embodiment of the invention shown in FIG. 1 and in the dimming control circuit of FIGS. 10 and 12 and the same reference characters have been used therein to indicate corresponding elements.

The circuits previously described deal with a system for producing a running sign on a lamp bank. The circuit of FIG. 14 accomplishes this result and, in addition, provides for stopping a running sign at a given point as determined by the presence of a stop code appearing in a column of the tape 7a' read by the tape reader 7. This stop code may be any suitable code which differs from the binary code groups identifying the alphabet and numerical characters displayed on the lamp bank. A series of conductors 162 extend respectively from the various output lines 7c of the tape reader 7 to the input of a decoding matrix 160 having separate output lines 164–1, 164–2 . . . 164–6 representing stop codes for stopping the sign respectively for 6 different intervals (such as 5, 10, 15, 20, 25 and 30 seconds). Obviously a greater number of stop codes could be provided for giving a larger variety of stopping periods. The decoder 160 is a conventional diode-type matrix which will energize the output line 164 which is associated with the time period identified by the binary code read by the tape reader 7 representing one of the stop codes referred to. It will be assumed that, when the output lines 164–1, 164–2 . . . 164–6 are respectively energized, this represents respectively six progressively increasing time periods during which the sign then displayed on the lamp bank will be stopped on the lamp bank.

The various decoder output lines 164 are respectively connected to an "OR" circuit which is a well-known circuit which will produce a signal at the output terminal 166' thereof when a given signal appears on any one of the inputs thereto. It is thus apparent that the "OR" circuit 166 will provide an output signal if a stop code is sensed by the tape reader 7. When such a signal occurs, it is fed by conductor 168 to the set input terminal S of a control bistable circuit 168, to effect setting of the bistable circuit upon the presence of any stop code.

A subtract shift register 170 of any one of a number of different designs may be provided. For example, it may be a shift register with a number of stages corresponding to the number of different basic time periods. In such case, the various output lines 164 of the decoder 160 may extend respectively to the set terminals S of the various stages of this shift register to set a marker in the stage of the shift register corresponding to the time period involved. A source 172 of shift pulses for the shift register 170 is provided where the shift pulses may be separated, for example, five seconds apart. It is thus apparent that if there is a marker stored in the No. 6 stage of the shift register 170, the marker will be read out of the first stage of the shift register circuit approximately thirty seconds after the marker was initially placed into the shift register. When the marker is shifted out of the No. 1 stage of the shift register circuit, a voltage appears in an output line 174 which is fed to the reset input terminal R of the control bistable circuit 168 to reset the same.

The control bistable circuit 168 has a pair of output lines 171 and 173 which, during the set state of the bistable circuit, may, for example, respectively have a positive voltage and ground thereon and during the reset state of the bistable circuit respectively have ground and a positive voltage thereon. The output line 171 extends to the input of the pair of gate circuits 174 and 176. The presence of a positive voltage on the line 171 results in the closing of the gate circuits 174 and 176 and the presence of a ground voltage thereon will result in the opening of the gate circuits.

The gate circuit 174 has input lines 180 extending from the A and B outputs of the shift pulse generator circuit 13 and output lines 182 extending to the A and B buses of the character read control circuit 14, the lamp control circuit 4 and the character memory unit 6. The gate circuit 176 has a pair of input terminals 183–183' respectively connected to the advance and read lines 86 and 83 of the character read control circuit 14 and output lines 185–185' extending respectively to the advance and read terminals of the tape reader 7 and the matrix 8.

It is thus apparent that when a stop code is being read by the tape reader 7, a set signal will appear on an output of the "OR" circuit 166 which will effect the setting of the control bistable circuit 168 which, in turn, results in the closing of the gate circuits 174 and 176 to stop the advancement of markers within the various shift register circuits of the lamp control circuit 4, the character memory unit 6 and the character read control circuit 14, and the stopping of the sign on the lamp bank 2 for a period determined by the duration the control bistable circuit 168 remains in a set state. As previously indicated, the control bistable unit 168 will be reset when the marker in the substract register 170 is removed from the No. 1 stage of the register.

The particular circuit disclosed in FIG. 14 is one wherein the apparent intensity of the lamp bank 4 remains constant with variation of the ambient light conditions about the lamp bank 2 and also with the nature of the sign on the lamp bank. When a running sign is stopped, the intensity of the light generator by the lamps is increased if the current flow through the lamps is not altered. In other words, when the sign on the lamp bank is stationary, the amount of current flow through the lamps thereof to produce a given light intensity is less than the current required by the lamps to produce the same light intensity in a running sign. The circuit of FIG. 14 reduces the width of the current pulses fed to the lamps when a stationary sign is displayed on the lamp bank. To this end, the time constant of the capacitor charge circuit of the double base diode relaxation oscillator circuit controlling the firing time of the main gated diode 114 is varied with the ambient light conditions of the lamp bank as well as the nature of the sign on the lamp bank 4.

The charge circuit for the capacitor 136 connected between the emitter electrode of the double base diode 138 and ground includes, in addition to the photocell 127, a pair of branch circuits extending respectively to the output lines 168 and 171 of the control bistable circuit 168. One of the branch circuits includes an adjusting resistor 144 and a rectifier 186 extending to the output line 173 of the control bistable unit 168 which is positive during the reset state of the bistable circuit and ground during the set state of the bistable circuit. The rectifier 186 is arranged to pass a positive voltage on the output line 173 and block ground from the charge circuit of capacitor 136. Accordingly, when a running sign is displayed on the lamp bank, the time constant of the circuit which charges the capacitor 136 is determined by the value of the adjusting resistor 144.

The other branch circuit in the charge circuit of the capacitor 136 includes an adjusting resistor 144' and a rectifier 186' connected to the other output line 171 of the control bistable circuit which is at ground during the reset state of the bistable circuit and positive during the set state of the bistable circuit. The rectifier 186' blocks ground from and passes positive voltage to the charge circuit. Accordingly, when a stationary sign is displayed on the lamp bank, the time constant of the circuit which charges the capacitor 176 is determined by the value of resistor 144' which is larger than the resistor 144, to delay the firing time of the main gated diode 114.

EXEMPLARY BINARY TO SINGLE OUTPUT MATRIX 8 OF FIG. 15

FIG. 15 shows an exemplary circuit for the binary to single output matrix 8 and the input and output devices and circuitry associated therewith. One of the input devices is the tape reader 7, which may be any one of a number of conventional tape readers. As illustrated the tape reader 7 has a set of six contacts 7d, each of which includes a spring urged movable contact 7d–1 which is adapted to pass through a hole of the tape 7a and a stationary contact 7d–2 which is engaged by the movable contact when the latter contact passes through the hole in the tape.

Each of the stationary contacts 7d–2 is connected to a common conductor 201 which is grounded. The movable contacts 7d–1 are respectively connected to separate buses 204. The buses 204 are connected through respective resistors 206 to a common conductor 207 leading to the positive terminal of a source of direct current voltage 208 whose negative terminal is grounded. It is thus apparent that when a movable contact 7d–1 of the tape reader 7 passes through a hole in tape 7a to engage the associated stationary contacts 7d–2 the associated bus 204 will be grounded and when the latter contacts are separated the associated bus 204 will be at a positive potential.

Each of the buses 204 are connected through a separate resistor 211 and a resistor 209 to the negative terminal of a source of negative voltage (not shown) whose positive terminal is grounded. The juncture between each associated pair of resistors 207 and 209 is connected by a conductor 210 to the base electrode 212b of an NPN transistor 212. The emitter electrode 212a of each transistor is grounded and the collector electrode 212c thereof is connected through a resistor 214 to the aforementioned bus 207 leading the positive terminal of the source of direct current voltage 208. The transistors 212 and associated circuits form part of the matrix 8. It is apparent that when a bus 204 is grounded the base electrode 212b of the associated transistor 212 will have a negative potential thereon which will render the NPN transistor 212 involved non-conductive. The ratio of the resistors 207 and 209 is such that when the associated bus 204 has a positive potential, the conductor 210 extending from the juncture of these resistors will be at a positive potential so as to render the associated transistors 212 conductive.

A conductor 220 extends from the end of each resistor 214 adjacent to the collector electrode 212c of the associated transistor 212 and a separate code bus 217. The various code buses 217 are identified respectively by references numerals 217a, 217b, 217c and 217d, 217e and 217f. When a transistor 212 is conducting, the associated conductor 220 and bus 217 will be at ground potential and when the transistor is non-conductive the conductor 220 and associated bus 217 will be at a positive potential. The various code buses 217 are connected through respective rectifiers 219 to ground, the rectifiers being arranged to block positive voltage and pass ground or a negative voltage.

A gating bus 220 is provided which is connected through a resistor 221 to the positive bus 207. The gating bus 220 is connected to the collector electrode 224c of an NPN transistor 224. The emitter electrode 224a of the transistor 224 is grounded and the base electrode 224b thereof is connected through a resistor 226 to the negative terminal of the source of negative voltage 227 whose positive terminal is grounded, and through a resistor 228 to a coupling capacitor 230 connected to the line 83 extending from the character read control circuit 14. A positive pulse will appear on the line 83 when a marker is being removed from the last stage of the shift register circuit constituting the character read control circuit 14. Ground clamping diodes 231 and 232 are respectively connected between the input side of the resistor 228 and the collector electrode 224c of transistor 224 and ground. These rectifiers bypass any negative voltage which may appear in the inputs to these rectifiers from the circuits coupled thereto.

When a positive pulse appears on the line 83 extending from the character read control circuit 14, this will render the transistor 224 conductive to couple ground potential to the gating bus 220. Normally, the gating bus 220 is positive due to the normal non-conductive state of transistor 224. The transistor 224 is rendered non-conductive by the connection of the base electrode 224b thereof through the resistor 226 to the negative terminal of the source of direct current voltage 227.

The potentials on the various code buses 217 and the gating bus 219 control the operation of "AND" circuits 240–1, 240–2, 240–3, 240–4, etc., there being one such "AND" circuit for each character to be displayed on the bank lamp. Each of the "AND" circuits 240 includes an NPN transistor 242 having an emitter electrode 242a which is grounded, a base electrode 242b which is coupled by a conductor 243 to one of the ends of a group of seven resistors 244–1, 244–2 . . . 244–7, and a collector electrode 242c connected through a resistor 241 to the positive bus 207. Each of the resistors 244 is assigned to one of the seven buses 220, 217a, 217b, 217c, 217e and 217f. The resistors 244–7 are all permanently connected to the gating bus. The other resistors of the group associated with each "AND" circuit are connected in different patterns to the various code buses 217a–217f so that the group of resistor associated with a given "AND" circuit will all be connected to ground bus only for the particular character involved. At all other times, at least all the other resistors 244–1 through 244–6 will be connected to a bus which is positive.

The conductor 243 associated with each of the "AND" circuits is also connected to one end of a resistor 248 whose opposite end is connected to the negative terminals of a source of direct current voltage (not shown) whose positive terminal is grounded.

The ratio of the resistors 248 to the resistors 244 is such that, when one of the resistors 244–1 through 244–7 of a group is connected to a positive bus, the potential on the conductor 243 leading to the base electrode 242b of the associated transistor 242 will be positive to render the same conductive and, when all of the resistors 244–1 through 244–7 of a group are connected to grounded buses, which occurs only momentarily when a gating pulse appears on the bus 220, the potential of the associated conductor 243 will be negative to render the associated transistor 242 non-conductive. Thus, a different one of the transistors 242 will be rendered non-conductive upon the appearance of a gating or read pulse on the input line 83 for a different character read by the tape reader 7. As a transistor 242 becomes momentarily non-conductive, a positive going voltage will appear at the end of the associated resistor 241, connected to the collector electrode 242c thereof. This voltage is coupled through a capacitor 250 to a group of diodes 11 forming part of the character set-up matrix 10. As previously indicated, the dodes 11 associated with a particular output of the matrix 10 are connected to set various bistable circuits of the character memory unit 6.

EXEMPLARY SHIFT REGISTER BISTABLE CIRCUIT OF FIG. 16

The bistable circuit of the lamp control circuit 4 which control the gated diodes 20 draw a relatively large amount of current and it is, therefore, desirable that the current drain of the bistable circuits be relatively low when the lamps controlled thereby are in a de-energized state. To this end, each of the bistable circuits 28 and 30 of the shift register circuits constituting the lamp control circuit 4 comprises a pair of transistors 90 and 90' which are respectively in a highly conductive state during the set state of the bistable circuit and are both in a non-conductive state during the reset state of the bistable circuit. One of the transistors 90 is a PNP transistor, and the transistor 90' is an NPN transistor. (Since the circuitry for each bistable circuit is identical, only the circuit 28a–1 of one of them will be described in detail.)

The collector electrode 91 of the transistor 90 is connected by conductor 92 to a positive bus 93 leading to the positive terminal of the source of positive voltage (not shown) whose negative terminal is grounded. (The bus 93, for example, may be a at voltage of 18 volts.) The collector electrode 96 of the transistor 90 is connected through a resistor 98 to ground.

The transistor 90' has an emitter electrode 260 which is connected to the reset terminal R. The reset terminal R is connected by a conductor 262 to the A bus 33'. The collector electrode 264 of the transistor 90' is connected by a resistor 266 to a positive bus 93', which may have a positive voltage of 22 volts. The collector electrode 264 of the transistor 90' is also connected through a resistor 270 to the base electrode 100 of the transistor 90. The set terminal S of the bistable circuit is connected to the base electrode 100 of the transistor 90. A resistor 272 is connected between the base electrode 274 of the transistor 90' and the ungrounded side of the resistor 98.

One of the advantages of the circuit shown in FIG. 16 is that the bistable circuits can be triggered from a reset state into a set state by the simple expedient of opening lines extending to the A and B buses 33 and 33'. This minimizes pulse distortion problems and the like which often occur when voltage control pulses are sent down long lines. (The various voltage sources which operate the bistable circuits shown in FIG. 16 are normally located a great distance from the lamp bank at which the bistable circuits are located.) To this end, the circuit shown in FIG. 3A is modified so that the pulses appearing at the A and B output terminals of the shift pulse generator circuit will be negative rather than positive pulses. The A and B output terminals of the shift pulse generator circuit are respectively connected to the base electrodes 280 and 280' of a pair of NPN control transistors 282 and 282'. The collector electrodes 283 and 283' of these transistors are respectively connected through resistors 286 and 286' to the aforementioned positive bus 93'. The emitter electrodes 287-287' of these transistors are coupled through diodes 289-289' to ground, the diodes being arranged to pass normal collector to emitter current. The base electrodes 280 and 280' of these transistors are coupled through resistors 290 and 290' to the positive terminal of a source of direct current voltage (not shown) which opposite terminal is grounded. The collector electrodes 283 and 283' of the transistors 282 and 282' are connected by conductors 291 and 291' respectively to the A and B buses 33 and 33'.

Normally, the control transistors 282 and 282' are in a conductive state due to the feeding of a positive voltage through the resistors 290 and 290' to the base electrodes 280 and 280' of the transistors 282 and 282'. Conduction of these transistors couples ground potential to the buses 33 and 33'.

The various bistable circuits 28 and 30 illustrated in FIG. 16 are normally in their reset state where the transistors 90 and 90' are non-conductive. These transistors are maintained in a non-conductive state by virtue of the connection of the positive voltage on the bus 93' through the resistors 266 and 270 to the base electrodes 100 of the transistors 90. As long as transistors 90 are non-conductive, ground potential is coupled through the associated resistors 282 to the base electrodes 274 of the associated transistors 90' which, since they are NPN transistors, render them non-conductive. The bistable circuit is triggered into a set state by the feeding of a negative pulse to the set terminal S thereof connected to the base electrode 100 of the associated NPN transistor 90. This renders the transistor 90 conductive which results in the voltage at the top of the associated resistor 98 being positive. This positive voltage is coupled through the resistor 272 to the base electrode 274 of the associated NPN transistor 90' to render the same conductive. When the transistor 90' becomes conductive, ground potential is coupled through the resistor 270, the base electrode 100, to the transistor 90 to maintain the same in a conductive state.

Each bistable circuit is reset by the simple expedient of momentarily opening the lines 291 and 291' leading to the buses 33 or 33'. This interrupts flow of current to the transistor 90'. As the transistor 90' is rendered non-conductive in this manner, the aforementioned ground potential fed through the resistor 270 to the base electrode 100 of the transistor 90 is removed and replaced by a positive voltage fed from the bus 93' which renders the transistor 90 non-conductive thereby reestablishing a stable non-conductive state for both transistors 90 and 90'.

The ground potential is removed from the buses 33 and 33' by the presence of a negative pulse on the A and B terminals leading to the base electrodes 280 and 280' of the control transistors 282 and 282'. This negative pulse will momentarily render the NPN transistors 282 and 282' non-conductive, thereby disconnecting ground potential from the buses 33 and 33'.

It should be understood that many modifications may be made in the various preferred forms of the invention described above without deviating from the broader aspects of the invention. For example, although the embodiment of FIG. 14 is applied to a combination running and stationary sign, many of the features therein are applicable to a non-running stationary sign system wherein the energization of the lamps is blocked out until the movement of the markers in the various shift registers is terminated.

We claim:

1. In combination with a running sign system including a source of energizing voltage, a lamp bank containing an upper and lower row of lamp banks which are energized to form horizontal upper and lower legs of various letters of the alphabet and intermediate rows of lamp banks between said upper and lower rows of lamps, one of which rows has lamps to be energized to form the horizontal central legs of various letters of the alphabet, and control means for energizing the lamps in the various rows in accordance with a pattern which proceeds horizontally across the lamp bank, said control means including switch means for completing circuits between said source of energizing voltage and the lamps in the bank in accordance with a predetermined sign forming program, the circuits for the lamps in said upper, lower and said one intermediate row of lamps including average current reducing means for producing a lower average current in the associated rows of lamp banks during the completion of the circuits than in the other intermediate rows of lamps to equalize the average intensity of the light produced by the lamp forming the horizontal upper and lower and central legs of the letters of the alphabet which are successively energized at a higher rate with the intensity of the light produced by said other intermediate rows of lamps as one of said letters proceeds across the sign.

2. The combination of claim 1 wherein there is provided between said source of energizing voltage and all of said lamps a common average current varying means for progressively varying simultaneously the average current flow through the lamps, light sensing means for sensing the ambient light conditions of the lamp bank, and means responsive to said light sensing means for operating said average current varying means to make the average current in said lamps inversely proportional to the ambient light conditions of the lamp bank.

3. In a combined running and stationary sign system including a lamp bank, a source of current for energizing the lamp bank and input means for receiving sign information to be displayed on the lamp bank and stop order information constituting an order to stop the running sign, the improvement comprising control means responsive to the information fed to said input means for completing lamp energizing circuits between said source of current and the lamps in the lamp bank for normally effecting the movement of sign information across said lamp bank and to stop the movement of the running sign when said stop order information is received, dimming means for effecting a relatively low level of average current flow in said lamp energizing circuits when in a first state for effecting a relatively high level of average current flow in said lamp energizing circuits when in a second state, and means responsive to said stop order information for automatically operating said dimming means in said first low current state when the sign information on said bank is stationary and responsive to the absence of said stop order information for automatically operating said dimming means in said second state when the sign information on said lamp bank is moving, wherein the intensity of the light from said lamps is more nearly equal for running and stationary signs on the lamp bank.

References Cited

UNITED STATES PATENTS

| | | | |
|---|---|---|---|
| 1,946,297 | 2/1934 | Suits | 340—334UX |
| 1,974,318 | 9/1934 | Suits | 340—334X |
| 2,123,459 | 7/1938 | Andersen | 340—334X |
| 3,084,338 | 4/1963 | Maner et al. | 340—213 |
| 3,166,742 | 1/1965 | Sherwin | 340—334 |
| 3,384,888 | 5/1968 | Harnden et al. | 340—339 |
| 3,389,389 | 6/1968 | Minear | 340—339 |

DONALD J. YUSKO, Primary Examiner

DAVID L. TRAFTON, Assistant Examiner

U.S. Cl. X.R.

340—332, 339